Patented Oct. 9, 1945

2,386,596

UNITED STATES PATENT OFFICE 2,386,596

AZO DYES

Moses L. Crossley and Byron L. West, Plainfield, N. J., assignors to American Cyanamid Company, New York, N. Y., a corporation of Maine No Drawing. Application November 5, 1941,
Serial No. 417,878

4 Claims. (Cl. 260—166)

This invention relates to new azo dyes containing hexylresorcinol as a component.

It has been proposed in the past to make certain azo dyes, particularly metallized azo dyes having resorcinol or dihydroxy naphthalene azo components. According to the present invention a new series of azo dyes is obtained by using hexylresorcinol, 1,3 - dihydroxy-4-hexyl-benzene as a component.

The dyes may be monoazo or polyazo and have the general formula:

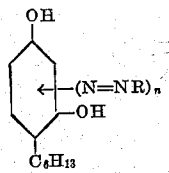

in which R is an aryl radical or an arylazoaryl radical and $n$ is 1 or 2. When $n$ is 1 and R is free from azo groups, monoazo dyes are obtained and when $n$ is 2 dis or higher polyazo dyes result.

When one or more of the aryl groups contain a metallizable group ortho to the azo group, the resulting dyes may be metallized with the usual metals and give colors of excellent fastness.

The dyes of the present invention may be used for dyeing various materials such as animal or vegetable fibers. The dyes preferably should contain a solubilizing group in one or more of the aryl radicals such as for example a sulfonic group. When such solubilizing groups are absent water insoluble dyes are obtained which can be used for coloring organic solvents, plastics and the like, as they are in general soluble in alcohols and aromatic hydrocarbons.

The dyes of the present invention may be prepared by the usual methods. Thus, for example, when a monoazo dye is desired an aromatic amine is diazotized and coupled with the hexylresorcinol. Disazo dyes may be obtained by coupling two molecular proportions of a diazotized arylamine with the hexylresorcinol or if the amine does not contain groups capable of azoic coupling the disazo dyes may be produced in two steps by first coupling one molecular proportion of diazotized amine with hexylresorcinol and then coupling a second portion of the same or a different diazotized aromatic amine with the monoazo dye obtained. Another method of preparing disazo dyes is to couple diazotized amino azo compounds with hexylresorcinol. This method also permits producing polyazo dyes having more than two azo groups.

The invention will be described in connection with the following specific examples which are illustrative. The parts are by weight.

Example 1

154 parts of p-nitroaminophenol were dissolved in 200 parts of water and diazotized with the addition of 30 parts of 36% hydrochloric acid and 69 parts of sodium nitrite at 10° C. and cooled to 5–0° C.

160 parts of soda ash were added to the dye produced by coupling 277 parts of diazotized amino azo benzene p-sulfonic acid to 194 parts of hexylresorcinol. The nitroaminophenol diazo was added to this dye and coupling allowed to stir overnight. The dye was precipitated by addition of 15 parts of sodium chloride per 100 parts of volume and the dye was filtered and dried.

Example 2

The diazo equivalent to 27.7 parts aminoazo benzene p-sulfonic acid, dissolved in 500 cc. of solution was coupled to 19.4 parts of hexylresorcinol at 0° to 5° C. in the presence of 20% sodium acetate solution. 22.1 parts of sodium picramate were dissolved in 400 cc. of hot water and 30 parts of 36% hydrochloric acid were added and the slurry was cooled to 25° C. At 25 to 30° C. it was diazotized with 6.9 parts of sodium nitrite dissolved in water. After 45 minutes the diazotization was complete and the slurry was cooled to 5–0° C. 16 parts of soda ash were added to the dye and the diazo picramic acid added and the coupling allowed to stir overnight. The next morning the pH was adjusted to 6. A very faint trace of red showed on methyl red yellow and it was negative to brilliant yellow paper. The dye produced was filtered without the addition of salt and when dry it was a brown color which dyed wool a brown tone.

Examples of further dyes falling under the present invention are shown in the following table.

| | First component | Second component | Third component | Color |
|---|---|---|---|---|
| 1 |  |  | 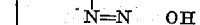 | Brown. |
| 2 |  |  | 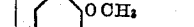 | Do. |
| 3 |  |  |  | Do. |
| 4 |  | 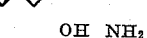 |  | Dark brown. |
| 5 |  |  |  | Do. |
| 6 |  |  |  | Do. |
| 7 |  |  |  | Brown. |
| 8 |  | | | Do. |

| | First component | Second component | Third component | Color |
|---|---|---|---|---|
| 9 | 2,4-dinitro-6-aminophenol (OH, O₂N, NH₂, NO₂) | 4-hexylcatechol (OH, OH, C₆H₁₃) | 2-amino-5-hydroxybenzenesulfonic acid (OH, H₂N, SO₃H) | Brown. |
| 10 | 4-nitroaniline (OH, NH₂, NO₂) | 4-hexylcatechol (OH, OH, C₆H₁₃) | 5-amino-naphthalene-sulfonic acid (NH₂, SO₃H) | Do. |
| 11 | 2,4-dinitro-6-aminophenol (OH, O₂N, NH₂, NO₂) | 4-hexylcatechol (OH, OH, C₆H₁₃) | 2-amino-5-nitrobenzenesulfonic acid (NH₂, NO₂, SO₃H) | Do. |
| 12 | 4-aminoazobenzene-4'-sulfonic acid (N=N, SO₃H, NH₂) | 4-hexylresorcinol (OH, OH, C₆H₁₃) | 2,4,6-trinitro-phenol (OH, O₂N, NO₂, NO₂) | Do. |
| 13 | 1-naphthylamine (NH₂) | 4-hexylresorcinol (OH, OH, C₆H₁₃) | 2-amino-4-nitro-6-sulfo-phenol (OH, O₂N, NH₂, SO₃H) | Do. |
| 14 | 4-hexylcatechol (OH, OH, C₆H₁₃) | benzidine (H₂N—◯—◯—NH₂) | 4-hexylcatechol (OH, OH, C₆H₁₃) | Do. |
| 15 | N,N-dimethyl-p-phenylenediamine (NH₂, N—CH₃, CH₃) | 4-hexylresorcinol (OH, OH, C₆H₁₃) | anthranilic acid (COOH, H₂N) | Do. |
| 16 | 2-amino-3-hydroxy-5-sulfo (NH₂, OH, HO₃S) | 4-hexylresorcinol (OH, OH, C₆H₁₃) | H₂N—◯—◯—N=N—◯—COOH, OH | Do |
| 17 | 4-hexylcatechol (OH, OH, C₆H₁₃) | H₂N—◯(CH₃)—◯(CH₃)—N=N—naphthyl-NH₂ | | Do. |
| 18 | 4-hexylresorcinol (OH, OH, C₆H₁₃) | H₂N—◯—◯—N=N—◯(COONa, OH) | | Orange. |
| 19 | 4-hexylresorcinol (OH, OH, C₆H₁₃) | H₂N—◯—N=N—naphthyl(HO)—N=N—◯—NH₂ | | Black. |

| | First component | Second component | Third component | Color |
|---|---|---|---|---|
| 20 | NH₂–C₆H₅ | 4-OH, 3-OH, C₆H₁₃ (phenol deriv.) | ---- | Yellow. |
| 21 | NH₂–C₆H₄–SO₃Na | OH, OH, C₆H₁₃ | NH₂–C₆H₃(CH₃)–CH₃ | Brown. |
| 22 | 4-amino-naphthalene-NaO₃S | OH, OH, C₆H₁₃ | NH₂-naphthalene-SO₃Na | Dark brown. |
| 23 | NH₂–C₆H₄–N(CH₃)₂ | OH, OH, C₆H₁₃ | ---- | Orange red. |
| 24 | NH₂–C₆H₄–NO₂ | OH, OH, C₆H₁₃ | ---- | Orange. |

| | First component | Second component | Third component | Fourth component | Color |
|---|---|---|---|---|---|
| 25 | NH₂–C₆H₄–COOH | OH, OH, C₆H₁₃ | ---- | ---- | Orange. |
| 26 | HO–C₆H₃(NH₂)–SO₃H | OH, OH, C₆H₁₃ | ---- | ---- | Garnet. |
| 27 | CH₃–C₆H₃(CH₃)–NH₂ | OH, OH, C₆H₁₃ | ---- | ---- | Orange. |
| 28 | NH₂–C₆H₄–SO₃H | OH, OH, C₆H₁₃ | ---- | ---- | Golden yellow. |
| 29 | NH₂-naphthalene-SO₃H | OH, OH, C₆H₁₃ | ---- | ---- | Orange red. |
| 30 | NH₂–C₆H₄–Cl | OH, OH, C₆H₁₃ | ---- | ---- | Golden yellow. |

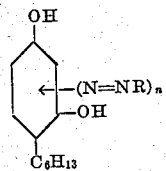
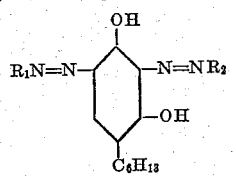
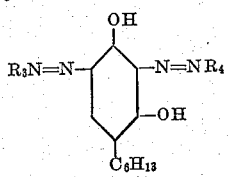
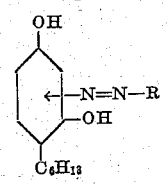

We claim:

1. An azo dye containing hexylresorcinol having the following formula:

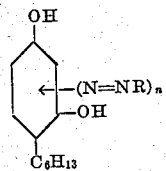

in which R is one or more radicals included in the group consisting of aryl radicals and arylazoaryl radicals and $n$ is a whole number included in the group consisting of 1 and 2.

2. An azo dye having the following formula:

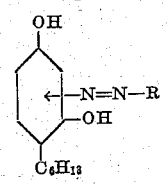

in which R is an aromatic radical free from azo groups.

3. Disazo dyes having the following formula:

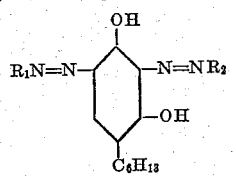

in which $R_1$ and $R_2$ are aryl radicals.

4. Polyazo dyes having the following formula

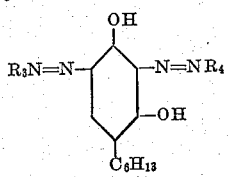

in which $R_3$ and $R_4$ are radicals included in the group consisting of aryl radicals and arylazoaryl radicals and at least one of them is an arylazoaryl radical.

MOSES L. CROSSLEY.
BYRON L. WEST.